W. C. Akers,
Mole Trap.
No. 98,539. Patented Jan. 4, 1870.
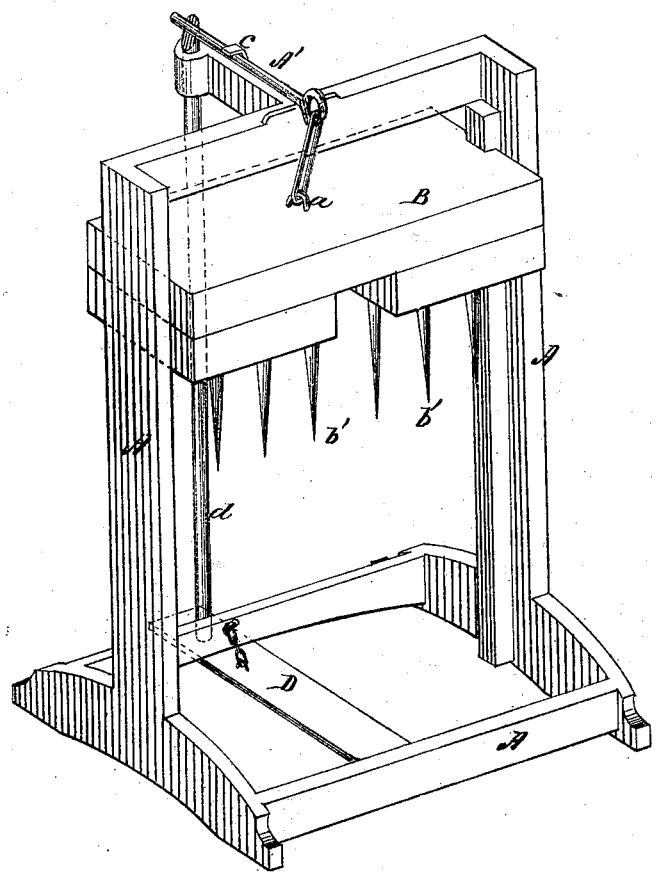

United States Patent Office.

WILLIAM C. AKERS, OF PETERSBURG, VIRGINIA.

Letters Patent No. 98,539, dated January 4, 1870.

IMPROVED MOLE-TRAP.

The Schedule referred to in these Letters Patent and making part of the same.

*To all whom it may concern:*

Be it known that I, WILLIAM C. AKERS, of Petersburg, in the county of Dinwiddie, and State of Virginia, have invented a new and improved Mole-Trap; and I do hereby declare that the following is a full, clear, and exact description of the construction and operation of the same, reference being had to the accompanying drawings, making a part of this specification.

In the drawings is represented a perspective view of my trap.

My invention relates to mole-traps of that class which is provided with spiked weights, arranged to slide in vertical frames, and which may be held in an elevated position by levers retained by a catch, from which they are disengaged to allow the weight to fall and impale the animal on the spikes.

The invention consists in the improved means of detaching the lever from the catch, as hereinafter described.

In the drawings—

A is the vertical frame.

B, the weight, armed with spikes $b$, and sliding in the frame A.

The weight B has a staple, or eye, $a$, in its upper side, with which is connected one end of a lever, A', having its fulcrum on the top of the frame.

When the weight is at the top of the guide-way, it is upheld by placing the lever A' at a point beyond its fulcrum, under a catch, $c$, in the top of the frame A.

Near its free end, the lever, when in this situation, is in contact with the sloping upper end of the rod $d$, the latter being pivoted at its bottom to the outer extremity of the earth-trigger D, which is itself jointed, at its opposite extremity, to the lower part of the frame A. The trigger D is placed in the earth at about the depth at which moles do mostly burrow, and is raised by the attempt of the animal to get under it at any point.

The raising of the trigger lifts the connecting-rod $d$, and forces the lever A' from under the catch, whereupon the spiked weight B falls and impales the mole.

Having thus described my invention,

What I claim as new, and desire to secure by Letters Patent, is—

The combination, with the earth-trigger D, lever A', and catch $c$, the rod $d$, when bevelled at its upper end, all constructed and arranged to operate as shown and described.

WILLIAM C. AKERS.

Witnesses:
PALANTINE R. AKERS,
LEMUEL E. IRVIN.